(12) United States Patent
Seitz et al.

(10) Patent No.: US 8,761,457 B1
(45) Date of Patent: Jun. 24, 2014

(54) ALIGNING GROUND BASED IMAGES AND AERIAL IMAGERY

(71) Applicant: Google Inc., Mountain View, CA (US)

(72) Inventors: Steven Maxwell Seitz, Seattle, WA (US); Carlos Hernandez Esteban, Kirkland, WA (US); Qi Shan, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/091,494

(22) Filed: Nov. 27, 2013

(51) Int. Cl.
*G06T 17/00* (2006.01)
*G06T 3/00* (2006.01)

(52) U.S. Cl.
USPC .......................... 382/113; 382/278; 382/294

(58) Field of Classification Search
None
See application file for complete search history.

(56) References Cited

U.S. PATENT DOCUMENTS

| | | | |
|---|---|---|---|
| 6,597,818 B2 | 7/2003 | Kumar et al. | |
| 8,116,596 B2 | 2/2012 | McIntyre et al. | |
| 8,160,400 B2 * | 4/2012 | Snavely et al. | 382/305 |
| 2007/0286490 A1 * | 12/2007 | Danowitz | 382/195 |
| 2011/0286660 A1 | 11/2011 | Ofek et al. | |
| 2013/0211790 A1 * | 8/2013 | Loveland et al. | 703/1 |

OTHER PUBLICATIONS

Sung Chun Lee et al., Automatic Pose Estimation of Complex 3D Building Models, Proceedings of the Sixth IEEE Workshop on Applications of Computer Vision (WACV'02), 2002, 5 pages total.*
Wu et al., 3D Model Matching with Viewpoint-Invariant Patches (VIP), IEEE Conference on Computer Vision and Pattern Recognition, Anchorage, Alaska, Jun. 23-28, 2008, pp. 1-8.
Kaminsky et al., "Alignment of 3D Point Clouds to Overhead Images", IEEE Computer Society Conference on Computer vision and Pattern Recognition Workshops, 2009, Miami, Florida, Jun. 20-25, 2009, pp. 63-70.
Mori et al., "View Generation with 3D Warping Using Depth Information for FTV", Signal Processing: Image Communication, vol. 24, 2009, pp. 65-72.
Snavely et al., "Modeling the World from Internet Photo Collections", International Journal of Computer Vision, vol. 80, Issue 2, Nov. 2008, pp. 189-210.
Umeyama, "Least-Squares Estimation of Transformation Parameters Between Two Point Patterns", IEEE Transactions on Pattern Analysis and Machine Intelligence, vol. 13, No. 4, Apr. 1991, pp. 376-380.

* cited by examiner

*Primary Examiner* — Brian P Werner
(74) *Attorney, Agent, or Firm* — Dority & Manning, P.A.

(57) ABSTRACT

Systems and methods for aligning ground based images of a geographic area taken from a perspective at or near ground level and a set of aerial images taken from, for instance, an oblique perspective, are provided. More specifically, candidate aerial imagery can be identified for alignment with the ground based image. Geometric data associated with the ground based image can be obtained and used to warp the ground based image to a perspective associated with the candidate aerial imagery. One or more feature matches between the warped image and the candidate aerial imagery can then be identified using a feature matching technique. The matched features can be used to align the ground based image with the candidate aerial imagery.

20 Claims, 10 Drawing Sheets

ALIGNING GROUND BASED IMAGES AND AERIAL IMAGERY

FIELD

The present disclosure relates generally to image processing, and more particularly to aligning ground based images with aerial imagery.

BACKGROUND

User generated images of a geographic area are typically captured from a perspective at or near ground level. These ground based images can be a valuable resource for refining representations of a geographic area provided, for instance, by a geographic information system. For example, user generated images can be used to refine or generate high resolution three-dimensional models of various landmarks, buildings, objects, terrain, etc. in a geographic information system. For the user generated images to be useful, accurate camera parameters, such as the pose of the images, and/or geographic position of objects depicted in the image need to be determined. As used herein, the pose of an image refers to the position and orientation of a camera that captured the image relative to a reference.

Geographic information systems can include a database of aerial imagery of a geographic area. The aerial imagery can be captured from an aircraft and can provide an oblique perspective of the geographic area from one of various canonical viewpoints, such as north, south, east, and west canonical viewpoints. The database of aerial imagery can be associated with accurate pose information. The known pose information associated with the aerial imagery can be a valuable reference for determining camera parameters associated with ground based user generated images.

Various techniques for determining camera parameters associated with images are known, such as bundle adjustment techniques. For these techniques to provide good accuracy, features need to be reliably matched between sets of images. It can be difficult to identify reliably matched features between ground based images and aerial imagery due to the large differences in camera viewpoint and imaging conditions associated with the ground based images and aerial imagery.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of aligning a ground based image with aerial imagery. The method includes obtaining, by one or more computing devices, a ground based image of a geographic area captured from a perspective at or near ground level. The method further includes identifying, by the one or more computing devices, candidate aerial imagery of the geographic area and transforming, by the one or more computing devices, the ground based image to a warped image having a projection associated with the candidate aerial imagery based at least in part on geometric data associated with the ground based image. The method further includes identifying, by the one or more computing devices, one or more feature matches between the warped image and the candidate aerial imagery and aligning, by the one or more computing devices, the ground based image with the candidate aerial imagery based at least in part on the one or more feature matches.

Other aspects of the present disclosure are directed to systems, apparatus, tangible, non-transitory computer-readable media, user interfaces and devices for aligning ground based imagery and aerial imagery.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
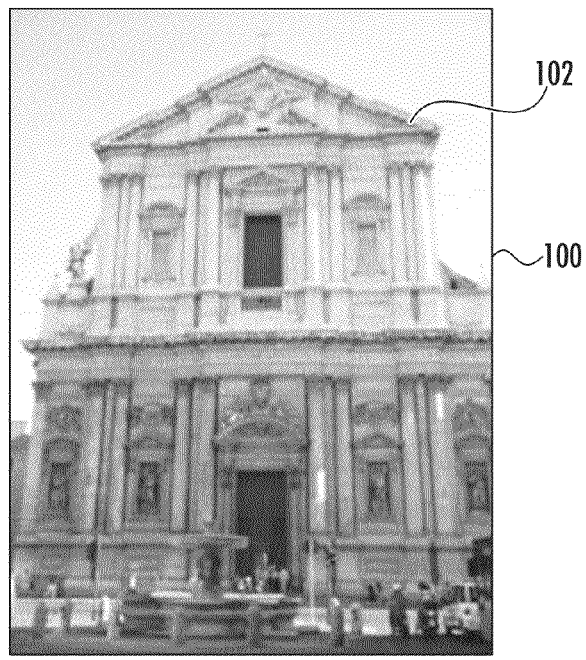
FIG. 1 depicts an example ground based image of a geographic area.

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure.

For instance, features illustrated or described as part of one embodiment can be used with another embodiment to yield a still further embodiment. Thus, it is intended that aspects of the present disclosure cover such modifications and variations.

Overview

Generally, example aspects of the present disclosure are directed to aligning ground based images of a geographic area taken from a perspective at or near ground level and a set of aerial images taken from, for instance, an oblique perspective. More particularly, it can be desirable to determine camera parameter information, such as camera pose, for ground based images using the known camera parameter information associated with aerial imagery. Features need to be reliably matched between ground based images and aerial imagery to accurately identify camera parameters for the ground based images based on camera parameters associated with the aerial imagery. Matching features between ground based images and aerial images can be difficult given the widely different camera perspectives and imaging conditions associated with the ground based images and aerial imagery.

According to example aspects of the present disclosure, images associated with a first and images associated with a second perspective are aligned so that one or more camera parameters and/or other characteristics associated with the images can be identified. For instance, ground based images and aerial imagery of a geographic area can be aligned. Example aspects of the present disclosure are discussed with reference to aligning ground based images and aerial imagery. Imagery captured from other perspectives can be aligned without deviating from the scope of the present disclosure.

In one particular example, candidate aerial imagery can be identified for alignment with the ground based image. The candidate aerial imagery can be identified, for instance, using an automated cropping process that crops aerial imagery based at least in part on the geographic position associated with the ground based image.

Once the candidate aerial imagery has been identified, geometric data associated with the ground based image can be obtained and used to warp the ground based image to a perspective associated with the candidate aerial imagery. For instance, a point cloud generated from the user generated image and other ground based images can be used to construct a depth map of the user generated image. The depth map can be used to reproject the ground based image to a projection associated with an aerial view.

One or more feature matches between the warped image and the candidate aerial imagery can then be identified using a feature matching technique. In one embodiment, the candidate aerial imagery can be normalized to facilitate feature matching between the warped image and the candidate aerial imagery. The normalization can address visual attributes of aerial imagery, such as shadowed north facing facades.

The matched features can be used to align the ground based image with the candidate aerial imagery. For instance, in one embodiment, the matched features can be used to estimate a similarity transformation for the ground based image. The similarity transformation can transform geometric data associated with the ground based image (e.g. a point cloud determined based at least in part on the ground based image) to be aligned with geometric data associated with the candidate aerial imagery (e.g. a polygon mesh generated from the aerial imagery). In other embodiments, one or more camera parameters (e.g. pose) can be determined and/or refined using the matched feature. For instance, a bundle adjustment algorithm can be used to refine the pose of the ground based image and to georeference features depicted in the ground based image using feature matches with the candidate aerial imagery.

As an example, a user can capture an image of a landmark from a perspective at or near ground level. Candidate aerial imagery having known pose information and depicting the landmark can be identified. Geometric data associated with the user generated image can be obtained and used to warp the user generated image to a projection associated with the candidate aerial imagery of the landmark. Features associated with the landmark can be matched between the warped image and the candidate aerial image. A three-dimensional point-to-point correspondence between the matched features can be determined from the geometric data associated with user generated image and from geometric data associated with the candidate aerial imagery. The geometric data associated with the user generated image can be transformed to be more aligned with the geometric data associated with candidate aerial image by positioning, scaling, and rotating the geometric data associated with the user generated image. A refined camera pose and/or geographic position information for the user generated image can also be determined based on the matched features. The camera pose and/or geographic position information can be used, for instance, to generate or enhance a three-dimensional model of the landmark based at least in part on the user generated image.

Example aspects of the present disclosure will be discussed with reference to aligning ground based images with candidate aerial imagery for purposes of illustration and discussion. Those of ordinary skill in the art, using the disclosures provided herein, will understand that candidate aerial imagery can similarly be aligned with ground based imagery without deviating from the scope of the present disclosure.

Example Ground Based Imagery and Aerial Imagery

FIG. 1 depicts an example ground based image 100. The ground based image 100 depicts a landmark 102 captured from a perspective at or near ground level. The ground based image 100 can be a user generated image captured by a user with a digital camera or other device. The ground based image 100 can have associated geometric data. For instance, the ground based image 100 can be captured by a stereo camera or other camera configured to capture an image with associated depth data (e.g. an RGBZ image).

The depth data associated with the ground based image 100 can include a depth map for the image. In other embodiments, the geometric data associated with the ground based image can include a point cloud generated based at least in part on the geometric data. A point cloud provides the depth/location and a color associated with selected points depicted in an image.

Figure 2:
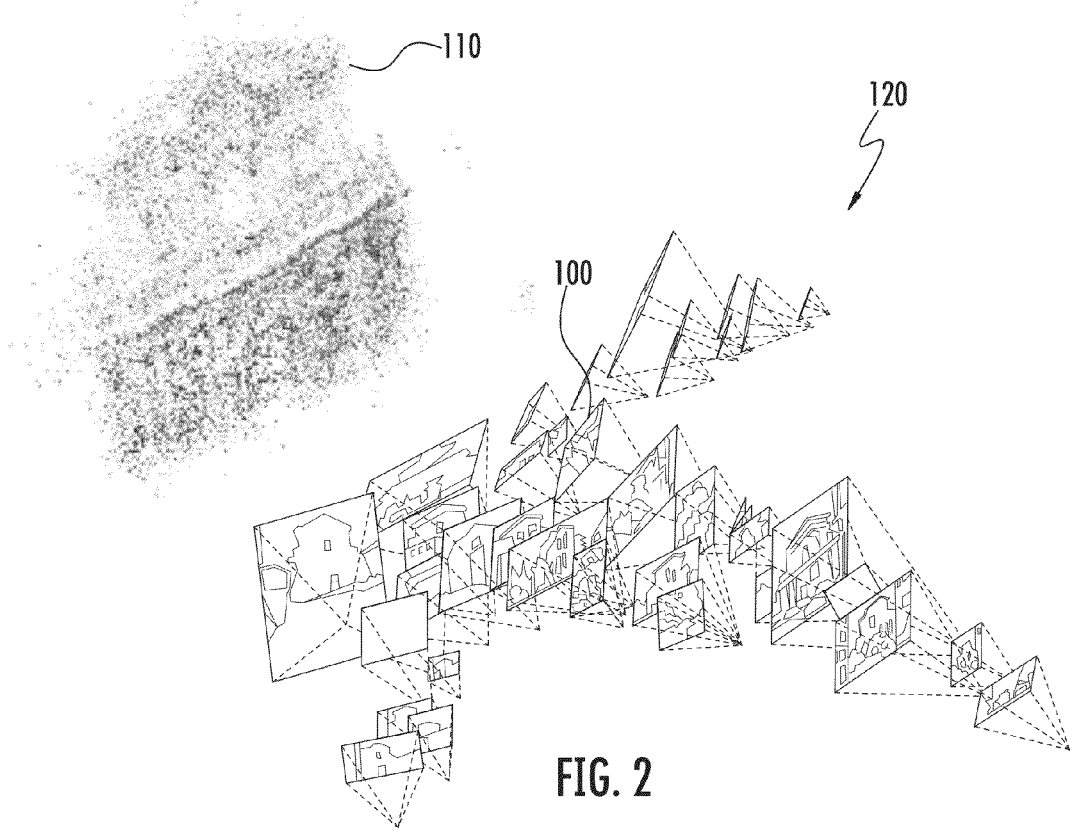
FIG. 2 depicts an example point cloud associated with a ground based image.

FIG. 2 depicts an example point cloud 110 associated with the ground based image 100. The point cloud 110 can be generated, for instance, based at least in part on a plurality of ground based images 120 captured of the landmark 102 (FIG. 1). The plurality of ground based images 120 can be images captured by the same user that captured the ground based image 100. Alternatively, the plurality of images 120 can be images previously captured of the landmark 102 and stored in a memory, such as in a database of geographic information system.

Structure-from-motion techniques can be used to generate the point cloud 110 from the plurality of images 120. Structure-from-motion techniques typically involve detecting features in a plurality of images. The motion of the detected features can then be tracked through a plurality of the images.

The feature trajectories over the images can then be used to determine the position of the features in three-dimensional space. Structure-from-motion techniques can also be used to determine the pose of the images in the plurality of images relative to a reference, such as the camera position of another ground based image.

In certain embodiments, the point cloud 110 can be used to generate a depth map for the ground based image 100 using, for instance, stereo matching techniques. For example, a plane sweep algorithm can be used to generate a depth map for the ground based image using the point cloud 110. Other techniques can be used to generate the depth map for the image 100 without deviating from the scope of the present disclosure.

Figure 3:
FIG. 3 depicts example aerial imagery depicting a geographic area.

FIG. 3 depicts example aerial imagery 130 depicting landmark 102 captured from an oblique perspective relative to the geographic area. The aerial imagery 130 can be generated from a plurality of images captured from camera mounted on an aircraft as the aircraft flies over the geographic area. The aerial imagery 130 can be accurately georeferenced imagery stored, for instance, in a geographic information system.

More particularly, a geographic information system can include aerial imagery 130 of a geographic area captured along various canonical viewpoints of the geographic area, such as along the north, south, east, and west directions. The aerial imagery 130 can be stored and indexed according to geographic coordinates. The aerial imagery 130 can be used to provide an interactive representation of the geographic area from an oblique perspective to a user of the geographic information system.

Figure 4:
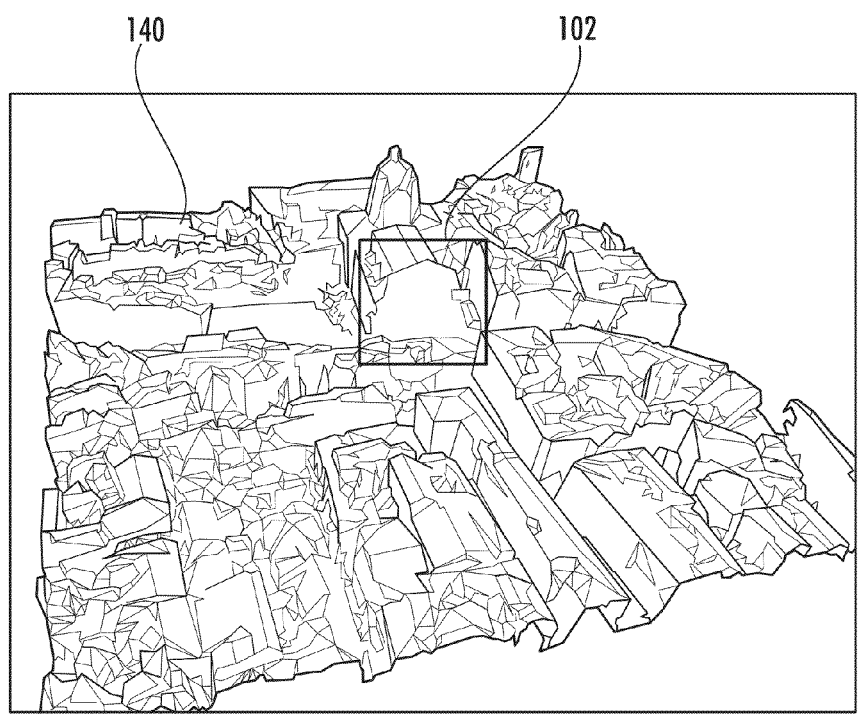
FIG. 4 depicts example geometric data associated with the aerial imagery.

The aerial imagery 130 can also have associated geometric data, such as a point cloud or depth map associated with the aerial imagery 130. In one embodiment, the geometric data can include a polygon mesh generated based at least in part from the aerial imagery 130. FIG. 4 depicts an example polygon mesh 140 generated at least in part on the aerial imagery 130. The polygon mesh 140 can provide a three-dimensional model of the geographic area depicted in the aerial imagery 130, including a model of landmark 102. The polygon mesh 140 can be a stereo reconstruction generated from the aerial imagery 130. More particularly, features can be detected and correlated with one another in various images used to construct the aerial imagery 130. The points can be used to determine the polygon mesh from the aerial imagery 130.

It can be desirable to align the ground based image 100 of FIG. 1 with the aerial imagery 130 of FIG. 3. More particularly, it can be desirable to determine the pose of the ground based image 100 and/or a geographic position of an object depicted in the ground based image 100 relative to a reference associated with the aerial imagery 130 (as opposed to a reference associated with other ground based imagery). In other aspects, it can be desirable to align the geometric data associated with the ground based imagery 100 with the geometric data associated with the aerial imagery 130, for instance, so that the geometric data associated with the ground based imagery 100 can be merged or otherwise used to modify or refine the geometric data associated with the aerial imagery 130.

Example Methods for Aligning Ground Based Image with Aerial Imagery

Figure 5:
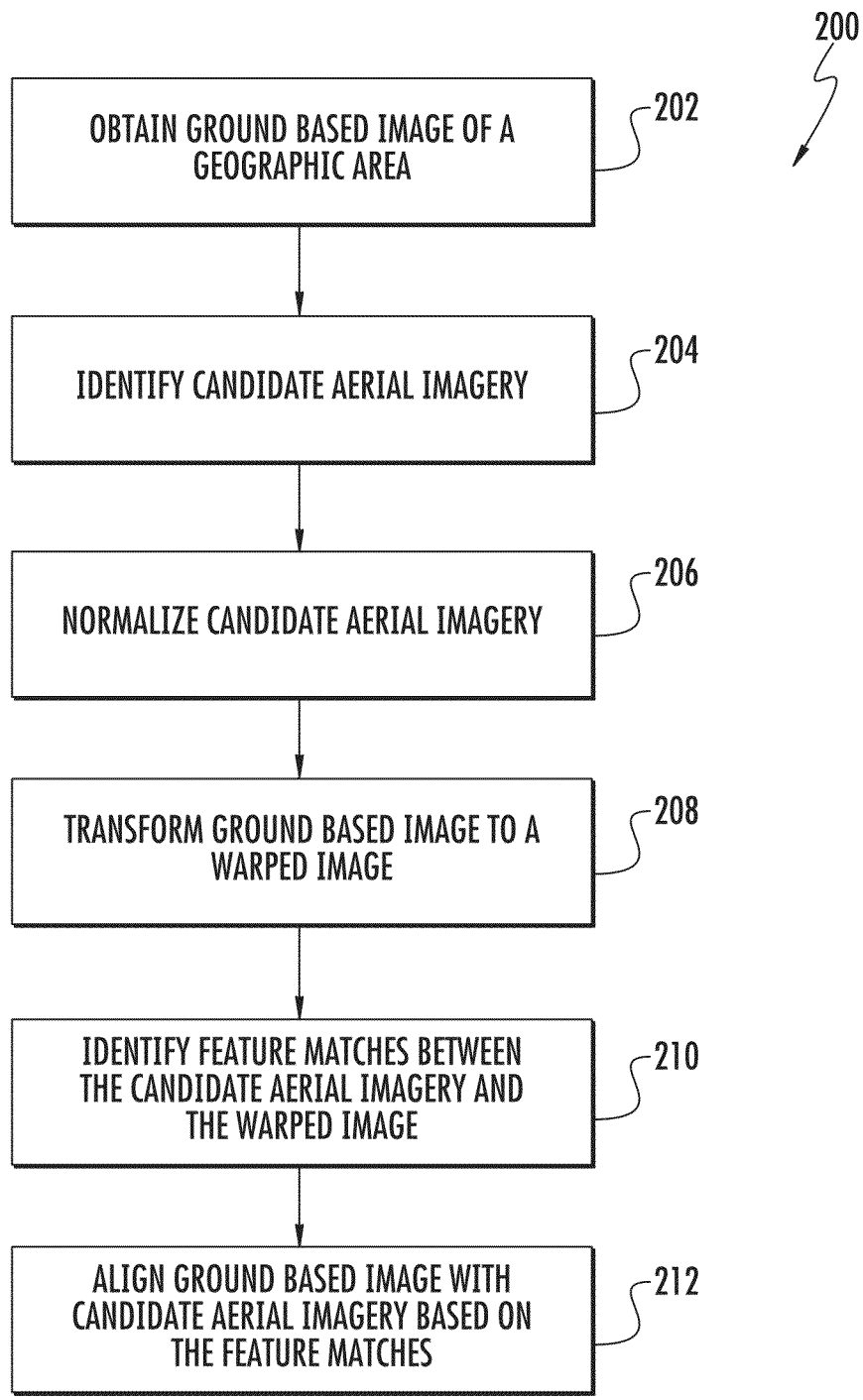
FIG. 5 depicts a flow diagram of an example method for aligning a ground based image with aerial imagery according to an example embodiment of the present disclosure.

FIG. 5 depicts a flow diagram of an example method (200) for aligning ground based imagery with aerial imagery according to example aspects of the present disclosure. The method (200) can be implemented by one or more computing devices, such as one or more of the computing devices depicted in FIG. 13. In addition, FIG. 5 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (202), the method (200) can include obtaining a ground based image of a geographic area. For instance, the ground based image 100 of FIG. 1 captured from a perspective at or near ground level can be obtained. As used herein, obtaining a ground based image can be, for instance, capturing the ground based image using an image capture device (e.g. a digital camera) or accessing the ground based image stored, for instance, in a memory.

At (204) of FIG. 5, the method (200) can include identifying candidate aerial imagery for alignment with the ground based image. Aerial imagery accessible in, for instance, a geographic information system, can include imagery for many different geographic areas. In addition, the aerial imagery can be available for a plurality of viewpoints, such as a north viewpoint, a south viewpoint, an east viewpoint, and a west viewpoint. To facilitate alignment with aerial imagery, candidate aerial imagery depicting the geographic area shown in the ground based image can be identified.

Figure 6:
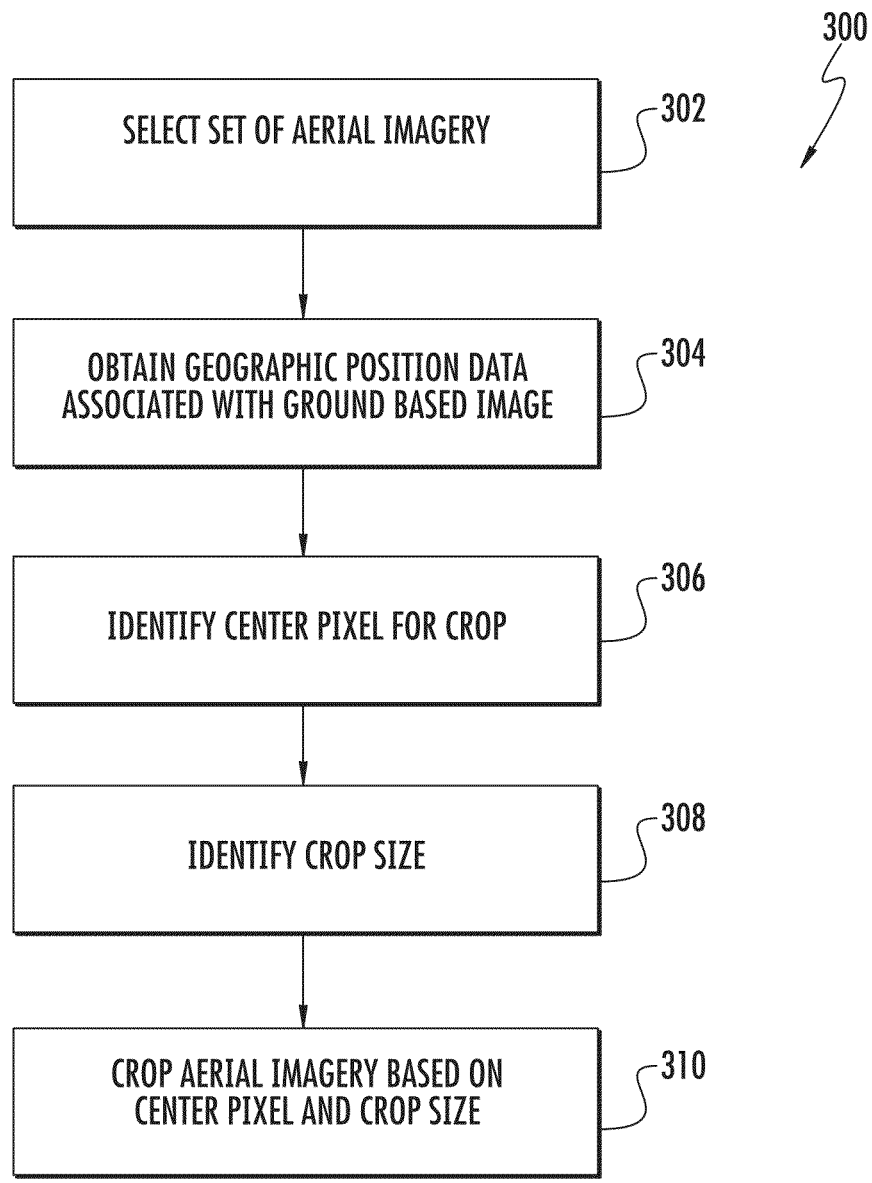
FIG. 6 depicts a flow diagram of an example method for identifying candidate aerial imagery according to an example embodiment of the present disclosure.

According to particular aspects of the present disclosure, candidate aerial imagery for alignment with ground based imagery can be identified using an automated cropping process that selects and crops aerial imagery based on geographic position data associated with the ground based image. FIG. 6 depicts a flow diagram of an example method (300) for identifying candidate aerial imagery according to an example embodiment of the present disclosure. The method (300) of FIG. 6 can be implemented by one or more computing devices, such as one or more of the computing devices depicted in FIG. 13.

At (302) of FIG. 6, the method (300) includes selecting a set of aerial imagery. For instance, aerial imagery associated with a particular view direction (e.g. a north view direction) can be selected for analysis. The set of aerial imagery can be selected, for instance, based at least in part on a view direction associated with the ground based image. More particularly, a pose of the ground based image may be known, for instance, from structure-from-motion techniques performed based at least in part on the ground based image. The pose of the ground based image can be used to select a set of aerial imagery associated with a view direction more closely aligned with the view direction of the ground based image. Alternatively, a trial and error approach can be used to select a set of aerial imagery.

At (304), geographic position data associated with the ground based image can be obtained. For instance, the ground based image can have associated metadata indicative of a geographic location of where the image was captured. The metadata can be generated, for instance, from a positioning system (e.g. a GPS system or other positioning system) associated with the image capture device used to capture the ground based image. Other techniques for obtaining data indicative of a geographic position associated with the ground based image can be used without deviating from the scope of the present disclosure.

The geographic position data can include two-dimensional coordinates (latitude and longitude) or three-dimensional coordinates (latitude, longitude, and altitude). In cases where only latitude and longitude coordinates are available, the altitude coordinate can be estimated using geometric data associated with the ground based image. For instance, the altitude can be computed as a mean altitude of points in a neighboring region in the geometric data associated with the ground based image.

At (306), the method (300) includes identifying a center pixel for cropping the set of aerial imagery based at least in part on the geographic position data associated with the ground based image. More particularly, a pixel of the aerial imagery having geographic coordinates associated with the geographic position of the ground based image can be selected as the center pixel. If the aerial imagery is not already georeferenced, a process such as a random sample consensus (RANSAC) process can be used to assign geographic coordinates to each pixel in the aerial imagery based on, for instance, the known geographic positions of aerial cameras used to capture the aerial imagery. Once the geographic coordinates for each pixel have been determined, the center pixel can be selected as the pixel having geographic coordinates commensurate with the geographic position of the ground based image.

At (308), a crop size for cropping the aerial imagery is identified. In one example implementation, the crop size can be a predefined crop size. For instance, the crop size can be predefined to 1001 pixels×1001 pixels. Alternatively, the crop size can be determined based on the ground based image. For instance, a point cloud associated with the ground based image can be projected to a perspective associated with the aerial imagery. A bounding box of the point cloud in the aerial imagery space can be used to determine the crop size for cropping the aerial imagery.

At (310), the method (300) includes cropping the set of aerial imagery based on the center pixel and the crop size. As an example, for an identified center pixel (cx, cy) and a crop size of 1001 pixels×1001 pixels, the aerial imagery can be cropped as (cx−500, cy−500) (cx+500, cy+500). The cropped aerial imagery can be identified as the candidate aerial imagery for alignment with the ground based image.

Figure 7:
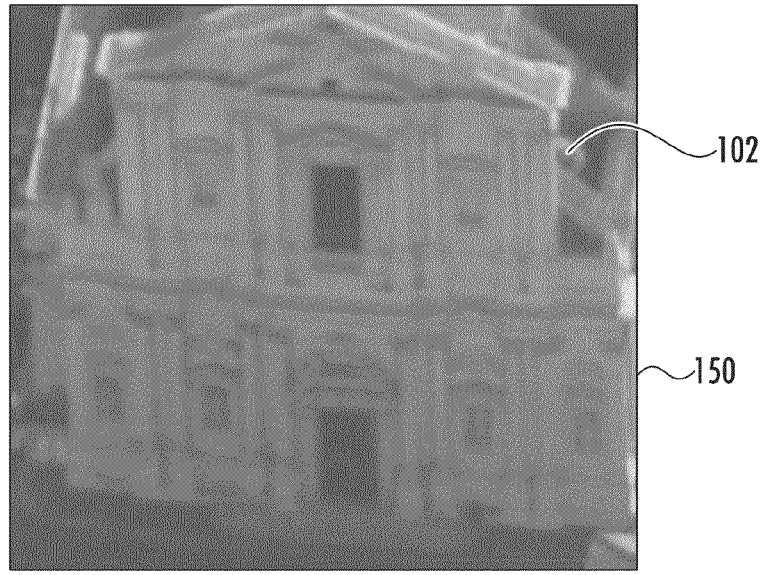
FIG. 7 depicts example candidate aerial imagery identified according to an example embodiment of the present disclosure.

FIG. 7 depicts example candidate aerial imagery 150 depicting landmark 102 identified according to example aspects of the present disclosure. The candidate aerial imagery 150 can be identified by cropping the aerial imagery 130 of FIG. 3 based at least in part on geographic position data associated with the ground based image 100 of FIG. 1.

Referring back to FIG. 5 at (206), the method (200) can include normalizing the candidate aerial imagery to facilitate feature matching. Aerial imagery tends to be smooth due to the hazing effects of air. In addition, aerial images are usually captured on sunny days and north facing facades of buildings and landmarks depicted in the aerial imagery can be in shadow. To address these issues, the candidate aerial imagery can be normalized to enhance the success of feature matching.

Figure 8:
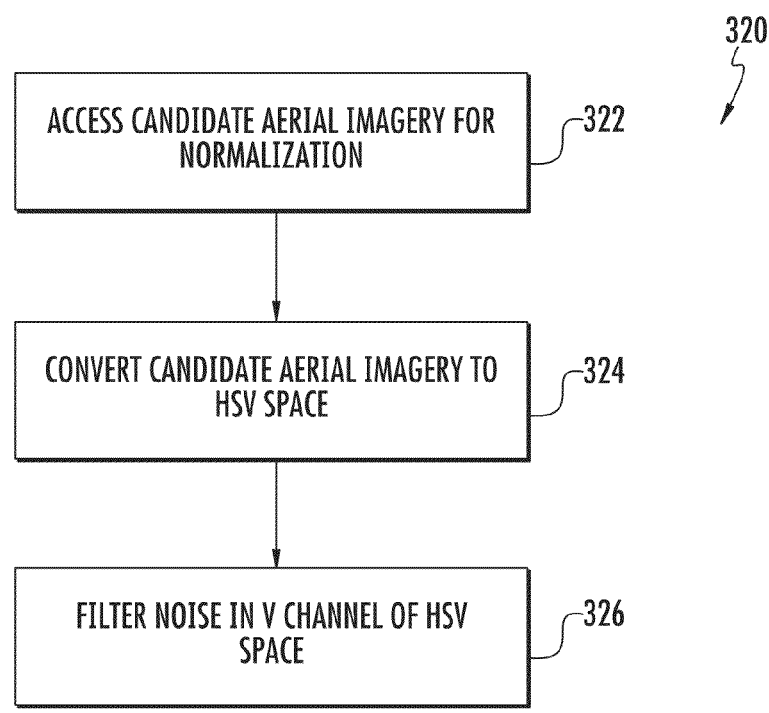
FIG. 8 depicts a flow diagram of an example method for normalizing candidate aerial imagery according to an example embodiment of the present disclosure.

FIG. 8 depicts one example method (320) for normalizing candidate aerial imagery according to example aspects of the present disclosure. The method (320) can be implemented by one or more computing devices, such as one or more of the computing devices depicted in FIG. 13. At (322) of FIG. 8, the method (320) includes accessing the candidate aerial image. For instance, the candidate aerial image can be accessed from a memory. The candidate aerial imagery can have pixel values defined in a red green blue (RGB) space. At (324), the candidate aerial imagery is converted from the RGB space to a hue saturation value (HSV) space. Noise in the value channel of the aerial imagery can then be filtered (326). For instance, the V channel of the aerial imagery can be enhanced using noise reduction and unsharp masking. Other suitable techniques can be used to normalize the candidate aerial imagery without deviating from the scope of the present disclosure. For example, bilateral filtering can be used to normalize the candidate aerial imagery. As another example, wavelet based operations can be used to normalize the candidate aerial imagery.

Figure 9:
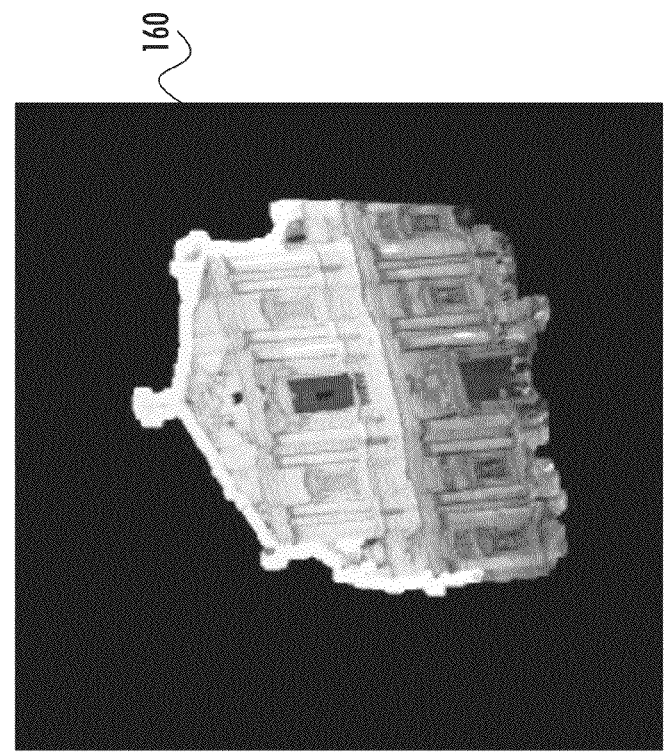
FIG. 9 depicts the example transformation of a ground based image to a warped image having a perspective associated with an aerial view according to an example embodiment of the present disclosure.
Figure 9:
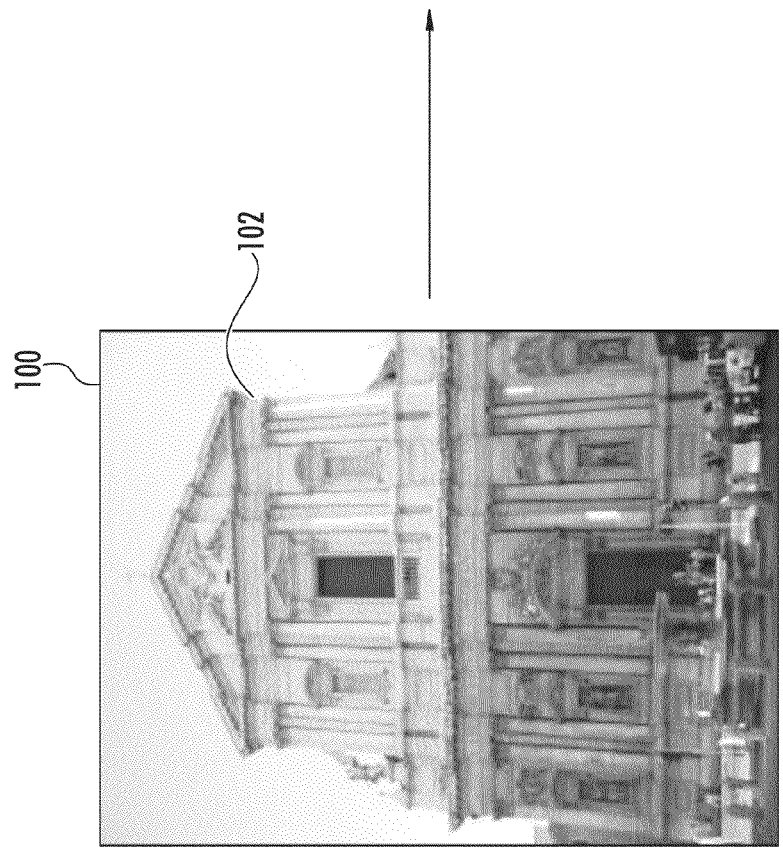

Referring back to FIG. 5 at (208), the method (200) can include transforming the ground based image to a warped image having a projection associated with the candidate aerial imagery. More particularly, the ground based image can be warped to an image plane associated with a view perspective aligned with the candidate aerial imagery. FIG. 9 depicts an example transformation of a ground based image to a warped image according to example aspects of the present disclosure. As shown, ground based image 100 depicting landmark 102 has been transformed to a warped image 160. The warped image 160 has a projection associated with a candidate aerial image identified for alignment with the ground based image, such as the candidate aerial image 150 of FIG. 7.

In one example implementation, the ground based image can be transformed to the warped image having a projection associated with the candidate aerial imagery based at least in part on geometric data associated with the ground based image. For example, a point cloud derived based at least in part from the ground based image can be accessed. A depth map for the ground based image can be computed from the point cloud. For instance, the depth map can be generated, for instance, using plane fitting techniques, such as a plane-sweep algorithm or other technique.

In one particular implementation, a depth smoothing process can be used to reduce noise. A RANSAC process can be performed to fit planes to points. For each trial, a plane can be fitted to a select number of points (e.g. 3 points). The number of points within a threshold distance to the plane can then be determined. The plane can be determined to exist if more than a threshold number of points are within the threshold distance to the plane. A depth can then be proposed for the points. The final depth value of each point can be the mean of all the depth proposals for the point and its original depth.

Once the depth map has been generated, the depth values can be used to project the ground based image to an image plane associated with the candidate aerial imagery. For instance, the depth values can be used to project the ground based image to a new projection associated with the candidate aerial imagery. The new projection can map the depth values to the image plane associated with the candidate aerial imagery.

Holes can be filled in the warped image using an iterative process analogous to a painter's algorithm. In a first iteration, each pixel in the ground based image can have a support size of n in a projection associated with the candidate aerial image. An n×n rectangle can be warped to the projection associated with the candidate aerial image. A depth buffer (z-buffer) can be maintained to paint the closest point to the warped image. For each successive iteration, the support size can be reduced by 1 and the painting can be performed. Once the painting is completed, a binary mask can be computed from the warped image. A binary mask value of 1 can be assigned to any paint pixel. Otherwise the binary mask value is 0. The mask can be dilated to identify small holes. An interpolation, such as bilinear interpolation, can be used to fill holes in the warped image Referring to back to FIG. 5 at (210), the method (200) includes identifying one or more matched features between the warped image and the candidate aerial imagery. More particularly, feature matching techniques can be used to identify matched features in the warped image and the candidate aerial imagery. Feature matching techniques compare the detected features in the images to determine groups of features that correspond to some fixed point in the scene depicted by the captured images. The features can be matched, for instance, based on appearance or based on feature similarity. Any suitable feature matching technique can be used to identify the matched features, such as a scale-invariant feature transform (SIFT) technique or other suitable feature matching technique.

Figure 10:
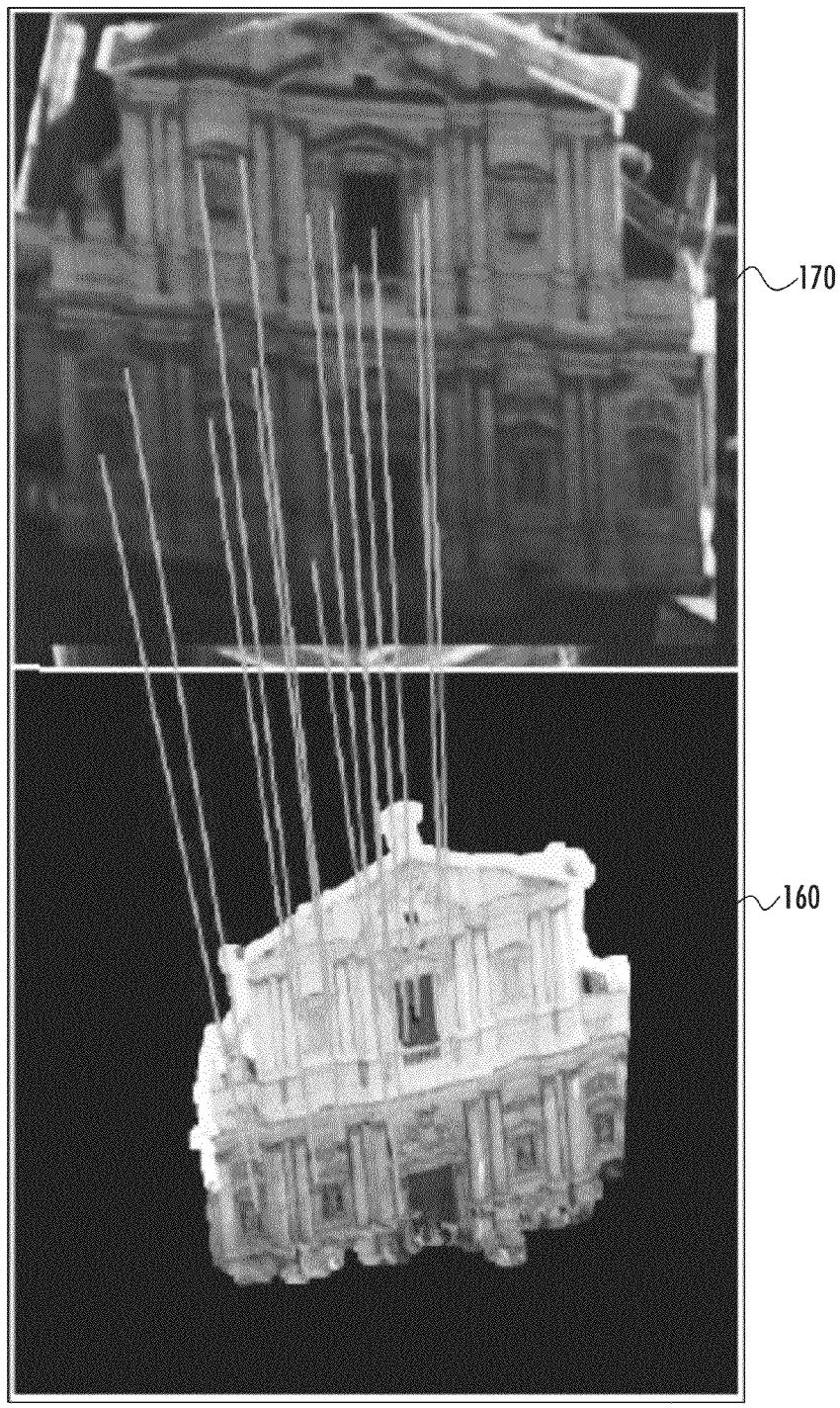
FIG. 10 depicts example feature matching between a warped image and a candidate aerial image according to an example embodiment of the present disclosure.

Transforming the ground based image to the warped image having a projection associated with the candidate aerial imagery facilitates the identification of matched features between the ground based image and the candidate aerial image. For example, FIG. 10 depicts the example identification of matched features between normalized candidate aerial imagery 170 and warped image 160. The plurality of lines between the candidate aerial imagery 170 and the warped image 160 are indicative of identified matched features.

Referring back to FIG. 5 at (212), the method (200) can include aligning the ground based image with the candidate aerial imagery based at least in part on the one or more matched features. Aligning the ground based image with the candidate aerial imagery can include, for instance, determining a pose of the ground based imagery relative to the candidate aerial imagery, georeferencing the ground based imagery based at least in part the candidate aerial imagery, and/or aligning geometric data associated with the ground based imagery and geometric data associated with the candidate aerial imagery.

In one embodiment, aligning the ground based image with the candidate aerial imagery based at least in part on the one or more matched features can include adjusting a pose associated with the ground based imagery using the one or more matched features. For instance, a bundle adjustment algorithm can be used to adjust the pose of the ground based imagery and to georeference objects depicted in the ground based image based at least in part on the matched features between the warped image and the candidate aerial imagery.

In another embodiment, aligning the ground based image can include aligning geometric data associated with the ground based image with geometric data associated with the candidate aerial imagery. More particularly, a similarly transformation can be estimated for the ground based image. The similarity transformation can transform geometric data associated with the ground based image to be more aligned with geometric data associated with the candidate aerial imagery.

Figure 11:
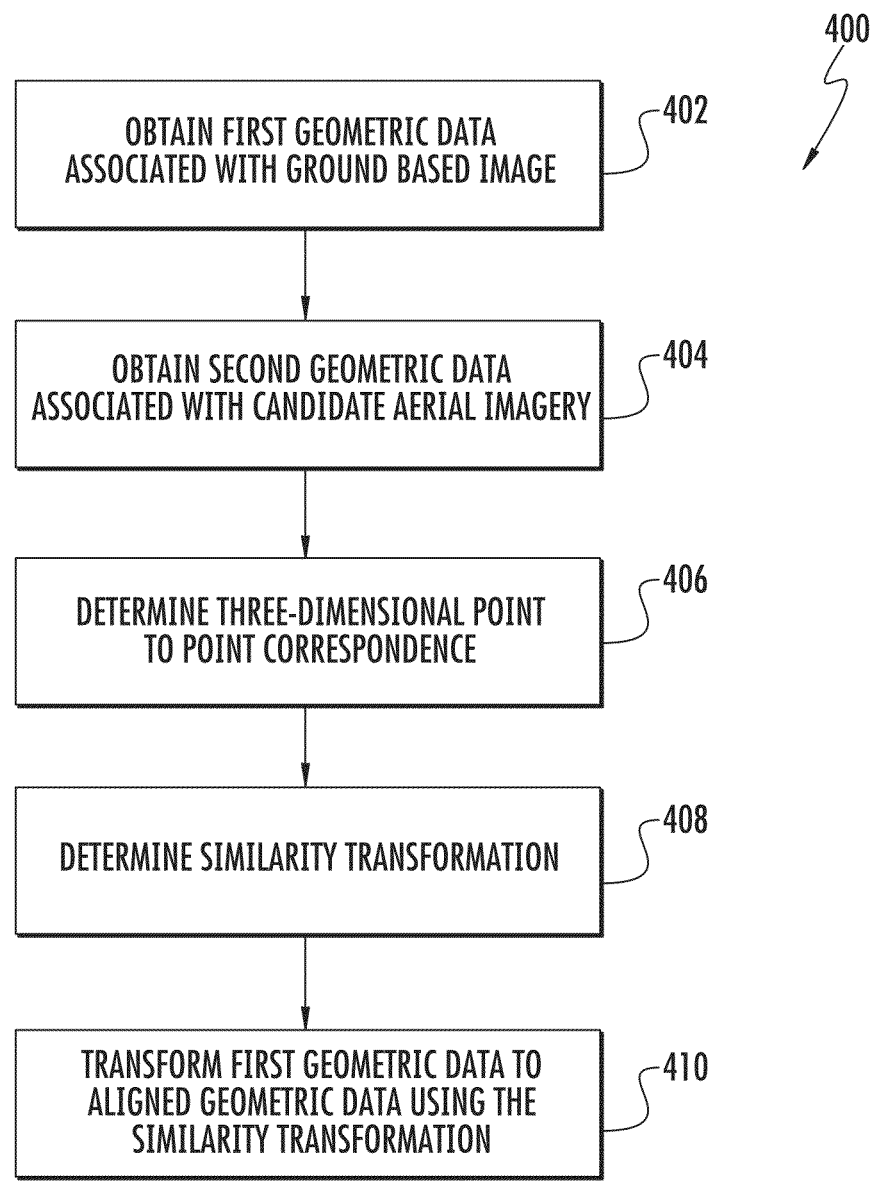
FIG. 11 depicts a flow diagram of an example method for aligning a ground based image with candidate aerial imagery based at least in part on one or more matched features according to an example embodiment of the present disclosure.

FIG. 11 depicts an example method (400) for aligning geometric data associated with the ground based image with geometric data associated with the candidate aerial image according to an example embodiment of the present disclosure. The method (400) can be implemented by one or more computing devices, such as one or more of the computing devices depicted in FIG. 13.

At (402), the method (400) includes obtaining first geometric data associated with the ground based image. For instance, a depth map generated for the ground based image can be obtained. The depth map can be generated, for instance, based at least in part on a point cloud associated with the ground based image.

At (404), the method (400) includes obtaining second geometric data associated with the candidate aerial imagery. The second geometric data can be a depth map associated with the candidate aerial imagery. In one implementation, the depth map can be associated with a polygon mesh generated based at least in part on the candidate aerial imagery.

At (406), the method (400) determines three-dimensional point-to-point correspondence for each of the matched features using the first geometric data and the second geometric data. For instance, a first three-dimensional point can be determined for a matched feature in the first geometric data associated with ground based image. A second three-dimensional point can be determined for the matched feature in second geometric data associated the candidate aerial image. The first three-dimensional point can be mapped to the second three-dimensional point as the three-dimensional point-to-point correspondence for the matched feature.

At (408), a similarity transformation is computed for the ground based image based at least in part on the three-dimensional point-to-point correspondence for each matched feature. In a particular implementation, the similarity transform can be computed using a RANSAC process and by implementing a least-square estimation of transformation parameters between point patterns algorithm. The transformation parameters can include rotation parameters, translation parameters, and scaling parameters for rotating, translating, and scaling the geometric data associated with the ground based imagery to be more aligned with the candidate aerial imagery. According to particular aspects of the present disclosure, the rotation parameters, translation parameters, and scaling parameters can be estimated to provide the least-squared errors between point patterns determined from the three-dimensional point-to-point correspondence associated with the matched features.

At (410), the geometric data associated with the ground based image can be transformed to aligned geometric data that is more closely aligned with the geometric data associated with the candidate aerial imagery using the similarity transform. The aligned geometric data can then be used, for instance, to update or refine the geometric data associated with the candidate aerial imagery, such as a polygon mesh generated from the candidate aerial imagery.

Example Methods for Aligning Aerial Imagery with Ground Based Image

Example aspects of the present disclosure are discussed with reference to aligning ground based images with candidate aerial imagery for purposes of illustration and discussion. Those of ordinary skill in the art, using the disclosures provided herein, will understand that candidate aerial imagery can be aligned with ground based imagery without deviating from the scope of the present disclosure.

Figure 12:
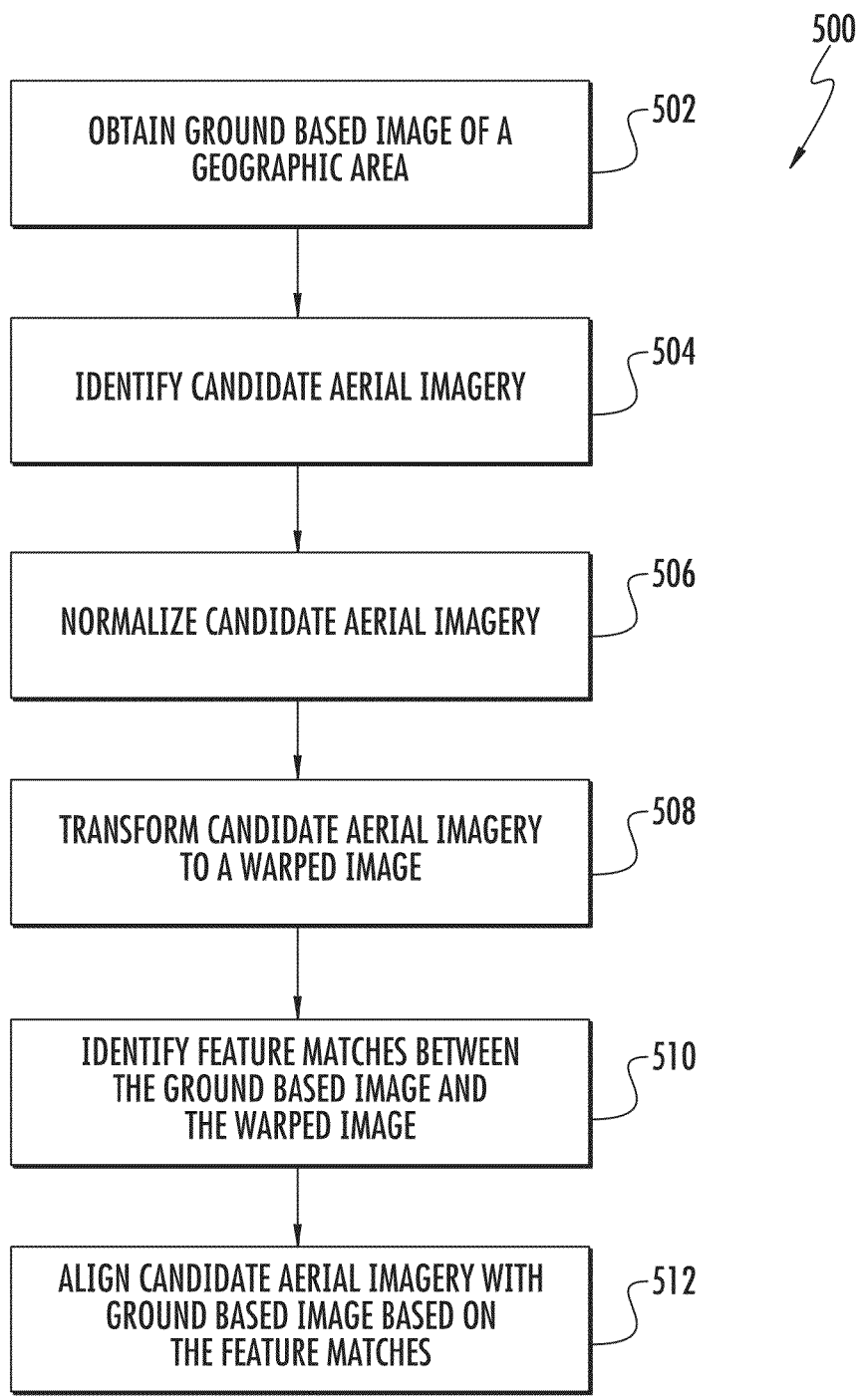
FIG. 12 depicts a flow diagram of an example method for aligning candidate aerial imagery with a ground based image according to an example embodiment of the present disclosure.

For instance, FIG. 12 depicts an example method (500) for aligning candidate aerial imagery with ground based imagery according to an example embodiment of the present disclosure. The method (500) can be implemented by one or more computing devices, such as one or more of the computing devices depicted in FIG. 13. Similar to the method (200) shown in FIG. 5, the method (500) of FIG. 12 can include obtaining a ground based image of a geographic area (502); identifying candidate aerial imagery of the geographic area (504); and normalizing the candidate aerial imagery (506).

At (508), the method (500) can include transforming the candidate aerial imagery to a warped image having a projection associated with the ground based image. More particularly, the candidate aerial imagery can be warped to an image plane associated with a view perspective aligned with the ground based image. In one example implementation, the candidate aerial imagery can be transformed to the warped image having a projection associated with the ground based image based at least in part on geometric data associated with the candidate aerial imagery. For example, a polygon mesh derived based at least in part from the candidate aerial imagery can be accessed. A depth map for the candidate aerial imagery can be determined from the polygon mesh. For instance, the depth values for pixels in the candidate aerial imagery can be determined, for instance, from the polygon mesh. Once the depth map has been generated, the depth values can be used to project the candidate aerial imagery to an image plane associated with ground based image. For instance, the depth values can be used to project the candidate aerial image to a new projection associated with the ground based image.

At (510), the method (500) can include identifying one or more matched features between the warped image and the ground based image. More particularly, feature matching techniques can be used to identify matched features in the warped image and the ground based image. At (512), the method (500) can include aligning the candidate aerial imagery and the ground based image. Aligning the ground based image and the candidate aerial imagery can include, for instance, determining a pose of the ground based imagery relative to the candidate aerial imagery, georeferencing the ground based imagery to the candidate aerial imagery, and/or aligning geometric data associated with the ground based imagery and the candidate aerial imagery.

For instance, in one embodiment, a similarity transform can be determined to provide transformation parameters (e.g. rotation parameters, translation parameters, scaling parameters) to transform the geometric data associated with the candidate aerial imagery to be more aligned with geometric data associated with the ground based image. Alternatively, a similarity transform can be determined to provide transformation parameters to transform the geometric data associated with the ground based image to be more aligned with geometric data associated with the candidate aerial imagery.

Example System for Aligning Ground Based Imagery and Aerial Imagery

Figure 13:
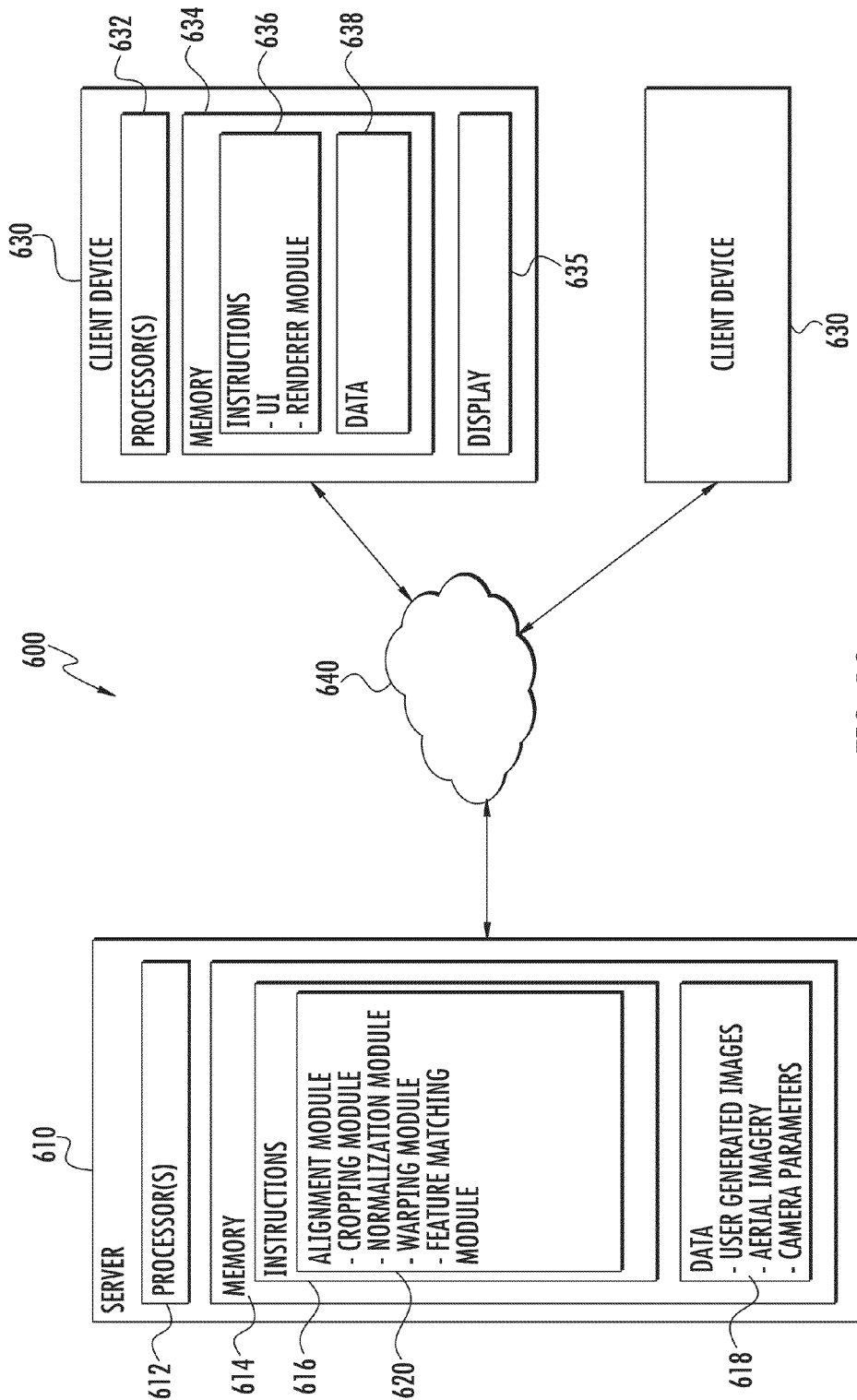
FIG. 13 depicts an example computing system according to an example embodiment of the present disclosure.

FIG. 13 depicts a computing system 600 that can be used to implement the methods and systems according to example aspects of the present disclosure. The system 600 can be implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can host a geographic information system. The server 610 can be implemented using any suitable computing device(s). The server 610 can have one or more processors 612 and memory 614. The server 610 can also include a network interface used to communicate with one or more client devices 630 over the network 640. The network interface can include any suitable components for interfacing with one more networks, including for example, transmitters, receivers, ports, controllers, antennas, or other suitable components.

The one or more processors 612 can include any suitable processing device, such as a microprocessor, microcontroller, integrated circuit, logic device, or other suitable processing device. The memory 614 can include any one or more computer-readable media, including, but not limited to, non-transitory computer-readable media, RAM, ROM, hard drives, flash drives, or other memory devices. The memory 614 can store information accessible by the one or more processors 612, including computer-readable instructions 616 that can be executed by the one or more processors 612. The instructions 316 can be any set of instructions that when executed by the one or more processors 612, cause the one or more processors 612 to perform operations. For instance, the instructions 616 can be executed by the one or more processors 612 to implement one or more modules configured to implement an alignment module 620 and/or various aspects of any of the methods disclosed herein.

The alignment module 620 can be configured to align ground based imagery and aerial imagery according to example aspects of the present disclosure. The alignment module 620 can include one or more modules, such as a cropping module, a normalization module, a warping module, and a feature matching module. The cropping module can be configured to identify candidate aerial imagery for alignment with ground based imagery using an automated cropping process, such as the method (300) of FIG. 6. The normalization module can be configured to process or normalize the candidate aerial imagery to facilitate feature matching, for instance, according to the method (320) of FIG. 8. The warping module can be configured to transform the ground based imagery to a warped image having a projection associated with the candidate aerial imagery (or vice versa). The feature matching module can be configured to identify one or more matched features between the warped image and the candidate aerial imagery. The alignment module 620 can be configured to align the ground based imagery and the candidate aerial imagery based at least in part on the matched features.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media. When software is used, any suitable programming language or platform can be used to implement the module.

Memory 614 can also include data 618 that can be retrieved, manipulated, created, or stored by the one or more processors 612. The data 618 can include, for instance, ground based images (e.g. user generated images), aerial imagery, camera parameters, geometric data associated with the ground based images and the candidate aerial images, and other information. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 13, any number of client devices 630 can be connected to the server 610 over the network 640. Each of the client devices 630 can be any suitable type of computing device, such as a general purpose computer, special purpose computer, laptop, desktop, mobile device, smartphone, tablet, wearable computing device, a display with one or more processors, or other suitable computing device.

Similar to the server 610, a client device 630 can include one or more processor(s) 632 and a memory 634. The one or more processor(s) 632 can include one or more central processing units (CPUs), graphics processing units (GPUs) dedicated to efficiently rendering images, and/or other processing devices. The memory 634 can include one or more computer-readable media and can store information accessible by the one or more processors 632, including instructions 636 that can be executed by the one or more processors 632 and data 638. For instance, the memory 634 can store instructions 636 for implementing a user interface module and a renderer module for presenting interactive imagery of a geographic area to a user. The interactive imagery can be generated based at least in part on ground based images aligned with candidate aerial imagery.

The client device 630 of FIG. 13 can include various input/output devices for providing and receiving information from a user, such as a touch screen, touch pad, data entry keys, speakers, and/or a microphone suitable for voice recognition. For instance, the client device 630 can have a display 635 for presenting geographic imagery of a geographic area to a user.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), cellular network, or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of aligning a ground based image with aerial imagery, the method comprising:
    obtaining, by one or more computing devices, a ground based image of a geographic area captured from a perspective at or near ground level;
    identifying, by the one or more computing devices, candidate aerial imagery of the geographic area;
    transforming, by the one or more computing devices, the ground based image to a warped image by projecting an image plane of the ground based image to an image plane associated with the candidate aerial imagery based at least in part on geometric data associated with the ground based image;
    identifying, by the one or more computing devices, one or more feature matches between the warped image and the candidate aerial imagery; and
    aligning, by the one or more computing devices, the ground based image with the candidate aerial imagery based at least in part on geometric data associated with the one or more feature matches.

2. The method of claim 1, further comprising normalizing, by the one or more computing devices, the candidate aerial imagery before identifying the one or more feature matches between the warped image and the candidate aerial imagery.

3. The method of claim 2, wherein normalizing, by the one or more computing devices, the candidate aerial imagery comprises:
    converting, by the one or more computing devices, the candidate aerial imagery from a red, green, blue (ROB) space to a hue, saturation, value (HSV) space; and
    reducing, by the one or more computing device, noise in a value channel of the aerial imagery in the HSV space.

4. The method of claim 1, wherein identifying, by the one or more computing devices, candidate aerial imagery of the geographic area comprises:
    obtaining, by the one or more computing devices, geographic position data associated with the ground based image; and
    cropping, by the one or more computing devices, aerial imagery of the geographic area based at least in part on the geographic position data to identify the candidate aerial imagery.

5. The method of claim 4, wherein cropping, by the one or more computing devices, aerial imagery based at least in part on the geographic position data to identify the candidate aerial imagery comprises:
    determining, by the one or more computing devices, a center pixel;
    determining, by the one or more computing devices, a crop size based at least in part on the geometric data associated with the ground based image; and
    cropping, by the one or more computing devices, the aerial imagery based at least in part on the crop size and the center pixel.

6. The computer-implemented method of claim 1, wherein the ground based image is transformed to a warped image based at least in part on a depth map generated for the ground based image.

7. The computer-implemented method of claim 1, wherein aligning, by the one or more computing devices, the ground based image with the candidate aerial imagery based at least in part on the one or more feature matches comprises determining, by the one or more computing devices, a similarity transformation for the ground based image, the similarity transformation configured to transform the geometric data associated with the ground based image to be more aligned with geometric data associated with the candidate aerial imagery.

8. The computer-implemented method of claim 7, wherein determining, by the one or more computing devices, a similarity transformation for the ground based image comprises:
    obtaining, by the one or more computing devices, first geometric data associated with the ground based image;
    obtaining, by the one or more computing devices, second geometric data associated with the candidate aerial image;

determining, by the one or more computing devices, a three-dimensional point-to-point correspondence for each of the one or more feature matches based at least in part on the first geometric data and the second geometric data;

determining, by the one or more computing devices, the similarity transformation based at least in part on the three-dimensional point-to-point correspondence; and transforming the first geometric data to aligned geometric; data using the similarity transformation.

9. The computer-implemented method of claim 1, wherein aligning, by the one or more computing devices, the ground based image with the candidate aerial imagery based at least in part on the one or more feature matches comprises adjusting, by the one or more computing devices, a pose associated with the ground based image based at least in part on the one or more feature matches.

10. The computer-implemented method of claim 9, wherein the pose associated with the ground based image is adjusted using a bundle adjustment algorithm.

11. The computer-implemented method of claim 9, wherein the method further comprises generating a three-dimensional model based at least in part on the pose associated with the ground based image.

12. The computer-implemented method of claim 1, wherein the ground based image is a user generated image.

13. The computer-implemented method of claim 1, wherein the candidate aerial imagery provides an oblique perspective of the geographic area.

14. A computing system, comprising:
one or more processors; and
one or more computer-readable media storing computer-readable instructions that when executed by the one or more processors cause the one or more processors to perform operations, the operations comprising:
obtaining a ground based image of a geographic area captured from a perspective at or near ground level;
identifying candidate aerial imagery of the geographic area;
transforming the candidate aerial imagery to a warped image by projecting an image plane of the candidate aerial image to an image plane associated with the ground based image based at least in part on geometric data associated with the candidate aerial imagery image;
identifying one or more feature matches between the warped image and the ground based image; and
aligning the candidate aerial imagery with the ground based image based at least in part on geometric data associated with the one or more feature matches.

15. The computing system of claim 14, wherein the operation of identifying candidate aerial imagery of the geographic area comprises:
obtaining geographic position data associated with the ground based image; and
cropping aerial imagery of the geographic area based at least in part on the geographic position data to identify the candidate aerial imagery.

16. The computing system of claim 14, wherein the operation of aligning the ground based image with the candidate aerial imagery based at least in part on the one or more feature matches comprises determining a similarity transformation for the candidate aerial imagery, the similarity transformation configured to transform the geometric data associated with the candidate aerial imagery to be more aligned with geometric data associated with the ground based image.

17. The computing system of claim 14, wherein the operation of aligning the ground based image with the candidate aerial imagery based at least in part on the one or more feature matches comprises determining a similarity transformation for the ground based image, the similarity transformation configured to transform the geometric data associated with the ground based image to be more aligned with geometric data associated with the candidate aerial imagery.

18. One or more non-transitory computer-readable media storing computer-readable instructions that when executed by one or more processors cause the one or more processors to perform operations, the operations comprising:
obtaining a ground based image of a geographic area captured from a perspective at or near ground level, the ground based image associated with first geometric data;
identifying candidate aerial imagery of the geographic area, the candidate aerial imagery associated with second geometric data;
transforming the ground based image to a warped image by projecting an image plane of the ground based image to an image plane associated with the candidate aerial imagery based at least in part on the first geometric data;
identifying one or more feature matches between the warped image and the candidate aerial imagery; and
aligning the ground based image with the candidate aerial imagery based at least in part on geometric data associated with the one or more feature matches.

19. The one or more non-transitory computer readable media of claim 18, wherein the operation of aligning the ground based image with the candidate aerial imagery based at least in part on the one or more feature matches comprises determining a similarity transformation for the ground based image, the similarity transformation configured to transform the first geometric data associated with the ground based image to be more aligned with the second geometric data associated with the candidate aerial imagery.

20. The one or more non-transitory computer-readable media of claim 18, wherein the operation of aligning the ground based image with the candidate aerial imagery based at least in part on the one or more feature matches comprises adjusting a pose associated with the ground based image based at least in part on the one or more feature matches.

* * * * *